United States Patent [19]

Kress et al.

[11] Patent Number: 4,774,273
[45] Date of Patent: Sep. 27, 1988

[54] PERFLUOROALKANESULPHONIC ACID ARYL ESTERS AS ANTI-DRIP AGENTS IN FLAME-REPELLANT MOLDING COMPOSITIONS BASED ON THERMOPLASTIC AROMATICPOLYCARBONATES

[75] Inventors: Hans-Jürgen Kress, Krefeld; Klaus Kircher, Leverkusen; Ludwig Bottenbruch, Krefeld; Ulrich Koemm, Cologne, all of Fed. Rep. of Germany

[73] Assignee: Bayer Aktiengesellschaft, Bayerwerk, Fed. Rep. of Germany

[21] Appl. No.: 749,701

[22] Filed: Jun. 28, 1985

[30] Foreign Application Priority Data

Jul. 7, 1984 [DE] Fed. Rep. of Germany ....... 3425122

[51] Int. Cl.$^4$ ............................................... C08K 5/42
[52] U.S. Cl. .................................................... 524/158
[58] Field of Search ....................... 524/158, 160, 159; 260/456 P, 456 R

[56] References Cited

U.S. PATENT DOCUMENTS

| | | | |
|---|---|---|---|
| 3,346,612 | 10/1967 | Hansen | 524/158 |
| 3,775,367 | 11/1973 | Nouvertne | 260/45.9 |
| 3,875,107 | 4/1975 | Nouvertne | 260/37 |
| 3,971,756 | 7/1976 | Bialous | 260/45.7 |
| 4,038,245 | 7/1977 | Reineke | 524/158 |
| 4,303,575 | 12/1981 | Reinert | 260/45.8 |
| 4,477,637 | 10/1984 | Krishnan | 524/158 |

FOREIGN PATENT DOCUMENTS

| | | |
|---|---|---|
| 2918882 | 11/1980 | Fed. Rep. of Germany . |
| 2918883 | 11/1980 | Fed. Rep. of Germany . |
| 1516544 | 7/1978 | United Kingdom . |
| 1516545 | 7/1978 | United Kingdom . · |
| 2039503 | 8/1980 | United Kingdom . |

OTHER PUBLICATIONS

Hawley, "The Condensed Chemical Dictionary", Van Nostrand Reinhold Company, (1981) p. 787.
Kirk-Othmer "Encylopedia of Chemical Technology", 3rd Edition, vol. 10, John Wiley and Sons, (1980) p. 953.

*Primary Examiner*—Veronica P. Hoke
*Attorney, Agent, or Firm*—Gene Harsh; Joseph C. Gil; Aron Preis

[57] ABSTRACT

The present invention relates to the use of perfluoroalkanesulphonic acid aryl esters as anti-drip agents in flame-repellant moulding compositions based on thermoplastic aromatic polycarbonates, moulding compositions containing flameproofing agents and these anti-drip agents and a process for the preparation of such moulding compositions.

16 Claims, No Drawings

PERFLUOROALKANESULPHONIC ACID ARYL ESTERS AS ANTI-DRIP AGENTS IN FLAME-REPELLANT MOLDING COMPOSITIONS BASED ON THERMOPLASTIC AROMATICPOLYCARBONATES

The present invention relates to the use of perfluoroalkanesulphonic acid aryl esters of the formula (I)

$$(R_FSO_2)_xAr \qquad (I)$$

wherein $R_F$ is a straight-chain or branched, aliphatic perfluoro-ligand with 1 to 20, preferably with 4 to 12, C atoms, which, in addition to fluorine atoms, contains at most one hydrogen atom and/or a different halogen atom on in each case two C atoms of the ligand, and in which the C chain can be interrupted by oxygen atoms, x is an integer from 1 to 20, preferably from 1 to 6, and Ar is a substituted or unsubstituted, carbocyclic or heterocyclic aromatic radical, which can consist of a ring or fused rings or bridged rings, an anti-drip agents in flame-repellant moulding compositions based on thermoplastic aromatic polycarbonates.

Examples of Ar are phenyl, alkylated phenyl, halogenated phenyl, biphenyl, phenylmethylphenyl, phenylisopropylphenyl and naphthyl.

Examples of $R_F$ are $C_4F_9$—, $C_8F_{17}$— and perfluoroalkyl radicals with 1-12 C atoms, and radicals in the form of —$(CF_2)_nH$, where n=1-12, and —$(CF_2—CFCl)_mF$, —$(CF_2—CFCl)_mH$ or —$(CF_2—CF_2—O)_mH$, where m=1-6.

Preferred radicals Ar are phenyl, biphenyl and phenylisopropylphenyl. Preferred radicals $R_F$ are perfluorobutane and perfluorooctane radicals.

The amounts of sulphonic acid aryl ester are between 0.2 and 2% by weight, preferably between 0.2 and 1% by weight, based on the thermoplastic polycarbonate, of sulphonic acid aryl esters of the formula (I).

Polycarbonate moulding compositions which have been provided with a flame-repellant finish are known. As is known, an excellent method for providing polycarbonates with a flame-repellant finish comprises adding alkali metal or alkaline earth metal sulphonates of aliphatic or aromatic sulphonic acids, which can optionally be substituted by fluorine, chlorine or bromine compare for example, DE-OS (German Published Specification) No. 1,930,257).

It is also known that the drip characteristics of polycarbonate moulding compositions which have been provided with a flame-repellant finish can be reduced by adding particular substances (see DE-OS (German Published Specification) No. 2,148,598, DE-OS (German Published Specification) No. 2,535,261, DE-OS (German Published Specification) No. 2,535,262 and DE-OS (German Published Specification) No. 2,535,263), either polysiloxanes or fluorinated polyolefines or glass fibres being added (see also DE-OS (German Published Specification) No. 2,918,882, DE-OS (German Published Specification) No. 2,918,883 or DE-OS (German Published Specification) No. 2,903,100).

The disadvantages of these systems are, for example, on the one hand, the deficient transparency when polysiloxanes are used and problems which may occur in processability, such as, for example, surface disorders when a fluorinated polyolefine is used or degradation of the polymer matrix when glass fibers are used.

In contrast, it was surprising that low molecular weight sulphonic acid esters can take over the function of these high molecular weight and/or fibrous additives.

An advantage of the low molecular weight anti-drip agents is the easier incorporation and processability in the polycarbonate moulding compositions, the sulphonic acid esters to be employed according to the invention being stable and scarcely volatile under the polycarbonate processing conditions. A particular advantage of the sulphonic acid esters to be used according to the invention is that they do not reduce the transparency of thermoplastic polycarbonates.

The present invention relates to moulding compositions based on thermoplastic aromatic polycarbonates containing a flameproofing agent and an anti-drip agent, characterised in that they contain, as the anti-drip agent, perfluoroalkanesulphonic acid esters of the formula (I) in amounts of 0.2 to 2% by weight, preferably 0.2 to 1% by weight, based on the thermoplastic polycarbonate.

The thermoplastic aromatic polycarbonates should contain the flameproofing agents in amounts of 0.02 to 2% by weight, and in particular 0.05 to 1% by weight, based on the thermoplastic polycarbonate.

Preferred flameproofing agents are alkali metal or alkaline earth metal salts of aliphatic or aromatic sulphonic acids.

Particularly preferred moulding compositions are flame-repellant and transparent, that is to say the sulphonic acid salts used as the flameproofing agent are soluble in the thermoplastic polycarbonate and/or have a refractive index which coincides with the thermoplastic polycarbonate (see V. Mark, Conference Paper, "Chemistry and Chemical Engineering", San Francisco, USA, August 1980 and, for example, DE-OS (German Published Specification) No. 2,903,100).

The present invention furthermore relates to a process for the preparation of moulding compositions based on thermoplastic aromatic polycarbonates containing flameproofing agents and anti-drip agents, characterised in that amounts of 0.02 to 2% by weight, based on the thermoplastic polycarbonate, of the flameproofing agent is incorporated, at the same time as or successively with amounts of 0.2% by weight to 2% by weight, based on the thermoplastic polycarbonate, of the anti-drip agent of the formula (I), into the thermoplastic polycarbonate at a temperature of 280° C. to 310° C., preferably at 290° C. to 300° C., via a twin-screw extruder with a speed of rotation of 80 to 100 revolutions per minute and a throughput of 5 kg/hour.

Thermoplastic aromatic polycarbonates in the context of the invention are homopolycarbonates based on 2,2-bis-(4-hydroxyphenyl)-propane (bisphenol A), copolycarbonates of bisphenol A with up to 20% by weight, based on the copolycarbonate, of other diphenols or mixtures of bisphenol A homopolycarbonates with copolycarbonates of bisphenol A with other diphenols, again up to 20% by weight, but based on the polycarbonate mixture, of other diphenols being copolycondensed in the copolycarbonate employed.

Examples of other diphenols which are suitable for the preparation of the copolycarbonates are 4,4'-dihydroxydiphenyl,α,α'-bis-(4-hydroxyphenyl)-p-isopropylbenzene, hydroquinone, bis-(hydroxyphenyl)sulphides, bis-(hydroxyphenyl)ethers, bis-(hydroxyphenyl)ketones, bis-(hydroxyphenyl)sulphoxides, bis-(hydroxyphenyl)sulphones, 2,2-bis-(3,5-dichloro-4-hydroxyphenyl)-propane and 2,2-bis-(3,5-dibromo-4-hydroxyphenyl)-propane.

These and other further suitable diphenols are known from the literature (see, for example, U.S. Pat. No. 3,028,365 and Schnell, "Chemistry and Physics of Polycarbonates", Interscience Publishers, New York 1964).

Thermoplastic polycarbonates which can preferably be employed are the bisphenol A homopolycarbonates and the copolycarbonates mentioned with up to 5% by weight, based on the copolycarbonate, of other copolycondensed diphenols.

The thermoplastic aromatic polycarbonates can be prepared by processes which are known from the literature, for example by the phase boundary process or by the melt transesterification process.

The molecular weights of the thermoplastic aromatic polycarbonates $\overline{M}w$ (weight-average molecular weight) should be between 10,000 and 200,000, preferably between 20,000 and 80,000 (measured, for example, by the light scattering method or determined by the relative viscosity in $CH_2Cl_2$ at 20° C. and at a concentration of 0.5 in 100 ml of $CH_2Cl_2$).

Preferred polycarbonates are those with relative viscosities of 1.26 to 1.35.

The thermoplastic aromatic polycarbonates can be branched in a known manner by incorporation of small amounts, preferably of amounts between 0.05 and 2.0 mol %, based on the diphenols employed, of compounds which are trifunctional or more than trifunctional, in particular those with three or more than three phenolic hydroxyl groups.

Polycarbonates of this type are described, for example, in German Offenlegungsschriften (German Published Specification) No. 1,570,533 and 1,595,762, British Patent Specification No. 1,079,821, U.S. Pat. No. Re. 27,682 and in German Patent No. 2,500,092.

Examples of some of the compounds with three or more than three phenolic hydroxyl groups which can be used are 2,4-bis-(hydroxy-phenyl-isopropyl)-phenol, 2,6-bis-(2'-hydroxy-5'-methyl-benzyl)-4-methylphenol, 2-(4-hydroxyphenyl)-2-(2,4-dihydroxyphenyl)-propane and 1,4-bis-(4,4''-dihydroxytriphenyl-methyl)-benzene.

Some of the other trifunctional compounds are 2,4-dihydroxybenzoic acid, trimesic acid, cyanuric chloride and 3,3-bis-(4-hydroxy-3-methylphenyl)-2-oxo-2,3-dihydroindole (isatin-bis-cresol).

Thermoplastic polycarbonates which can particularly preferably be employed are branched bisphenol A homopolycarbonates and branched copolycarbonates of bisphenol A with up to 5% by weight, based on the copolycarbonate, of other copolycondensed diphenols.

Examples of flameproofing agents for thermoplastic polycarbonates are alkali metal or alkaline earth metal salts of organic or inorganic acids, such as are described, for example, in German Offenlegungsschriften (German Published Specification) No. 2,703,710, No. 2,918,882, No. 2,918,883, No. 2,461,077 and No. 2,461,146.

Examples which may be mentioned here are: trisodium- or tripotassium-hexafluoroaluminate,-hexafluorotitanate or -hexafluorosilicate, sodium or potassium tetrafluoroborate, sodium or potassium pyrophosphate, sodium benzenesulphonate, magnesium benzenesulphonate, disodium naphthalene-2,6-disulphonate, potassium or sodium 2,4,5-trichlorobenzenesulphonate, potassium or sodium 2,5-dichlorobenzenesulphonate, potassium perfluorobutanesulphonate and alkali metal salts of diphenylsulphone-3-sulphonic or diphenylsulphone-3,3'-disulphonic acid.

Preferred flameproofing agents for thermoplastic polycarbonates are alkali metal or alkaline earth metal salts of aliphatic or aromatic sulphonic acids, which can optionally be substituted by fluorine, chlorine or bromine.

Examples which may be mentioned here are: sodium benzenesulphonate, magnesium benzenesulphonate, disodium naphthalene-2,6-disulphonate, potassium or sodium 2,4,5-trichlorobenzenesulphonate, potassium or sodium 2,5-dichlorobenznesulphonate, potassium perfluorobutanesulphonate and alkali metal salts of diphenylsulphone-3-sulphonic or diphenylsulphone-3,3'-disulphonic acid.

Particularly preferred flameproofing agents which are soluble in the polycarbonate and/or have a refractive index which coincides with the polycarbonate are, for example, alkali metal salts of perfluorobutanesulphonic acid and alkali metal salts of diphenylsulphone-3-sulphonic acid or diphenylsulphone-3,3'-disulphonic acid.

The sulphonic acid esters of the formula (I) which can be used according to the invention are either known from the literature or can be prepared by processes which are known from the literature (see DE-OS (German Published Specification) No. 1,952,387, U.S. Pat. No. 3,346,612 or Niederprüm, P. Voss, V. Beyl, J. Liebigs. Ann. Chem. 1 (1973) pages 20 to 32).

Sulphonic acid esters which are particularly suitable according to the invention are those of the following formulae (Ia) to (Im).

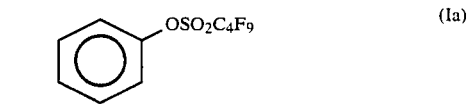
(Ia)

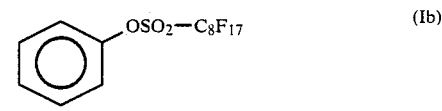
(Ib)

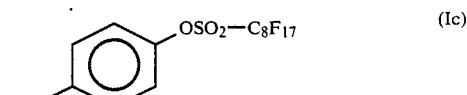
(Ic)

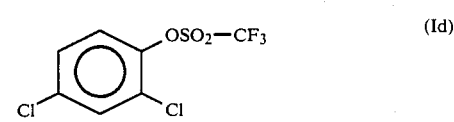
(Id)

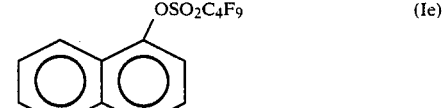
(Ie)

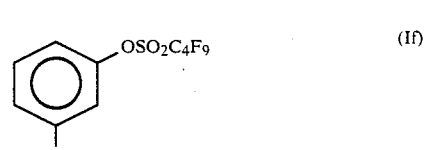
(If)

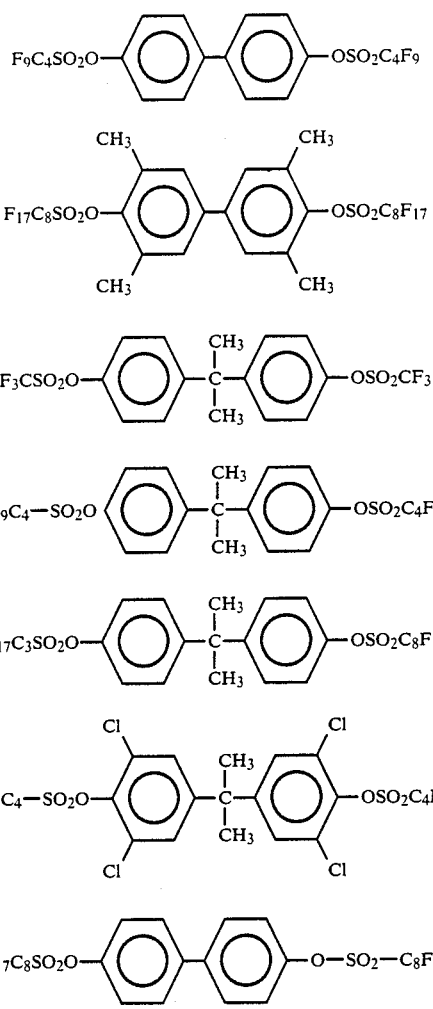

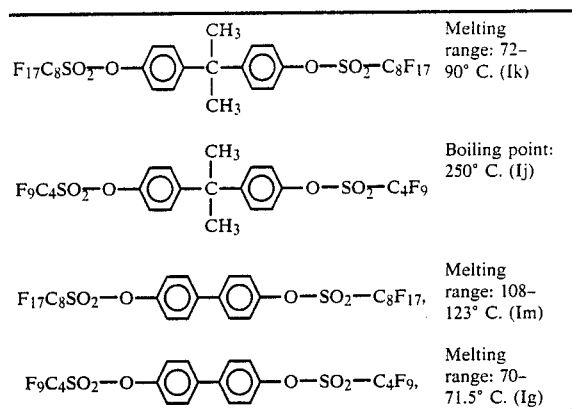

These sulphonic acid esters are prepared, for example, by reacting silylated phenols with perfluoroalkanesulphonyl fluorides in the presence of strong Lewis bases at temperatures of 20°–300° C., preferably 50°–150° C. (see DOS (German Published Specification) No. 1,952,387).

The incorporation of the flameproofing additives and the anti-drip agents can take place simultaneously or in succession in the usual mixing units at temperatures from 280° C. to 310° C., preferably 290° to 300° C. It is possible to incorporate either first the flameproofing agents and then the anti-drip agents or first the anti-drip agents and then the flameproofing agents.

Masterbatch processes can be used.

The flame-repellant and, if appropriate, transparent moulding compositions according to the invention can also contain other additives which are customary in polycarbonate chemistry, such as, for example, pigments, dyestuffs, fillers, stabilisers or mould release agents.

The moulding compositions according to the invention can be processed to shaped articles, films and the like in a known manner and can be used, for example, in the electrical field for switch panels, sockets, plug boards, switchboxes and the like, in the household sector for housing components for clothes irons and coffee machines and in the large apparatus field, for example for computer housing components.

The following sulphonic acid esters were employed in the examples below:

Polycarbonate A used:

A product prepared from bisphenol A, 0.5 mol % of 3,3-bis(4-hydroxy-3-methyl-phenyl)-2-oxo-2,3-dihydroindole, 3.0 mol % of phenol, as a chain stopper and phosgene by the phase boundary process with a solution viscosity of 1.31 (measured in $CH_2Cl_2$ at 25° C. and at a concentration of 0.5 g/100 ml) was employed.

Sulphonic acid salt B used:

K n-perfluorobutanesulphonate (known from the literature)

EXAMPLES

The polycarbonate moulding compositions were prepared by mixing components A and B and, if appropriate, a sulphonic acid ester C by means of a twin-screw extruder at a temperature of 300° C. and with a throughput of 5 kg/hour at a speed of rotation of 80/minute.

Test bars having the dimensions 127×12.7×3.2 mm (5.00×0.5×⅛ inches) were shaped from the resulting granules on an injection-moulding machine at 300° C. These test pieces were kept at room temperature (23° C.) for 2 days and then investigated for their tendency to drip.

For these, 5 test pieces were ignited by means of 5 successive ignition operations of 10 seconds duration, and the number of bars on which the formation of burning drips occurred was determined. The experimental design corresponded to the data given according to UL-94 (underwriters; Laboratories, Inc.) for the UL-94 V test.

| Composition | | | | | |
|---|---|---|---|---|---|
| A % by weight | 99.9 | 99.4 | 99.4 | 99.4 | 99.4 |
| B % by weight | 0.1 | 0.1 | 0.1 | 0.1 | 0.1 |
| $C_1$ % by weight | | 0.5 | | | |
| $C_2$ % by weight | | | 0.5 | | |
| $C_3$ % by weight | | | | 0.5 | |
| $C_4$ % by weight | | | | | 0.5 |
| Number of test pieces (out of 5) which show burning drips during 5 flamings | 3 | 0 | 0 | 0 | 0 |
| Appearance | transparent | transparent | transparent | transparent | transparent |

We claim:

1. A process for the treatment of a polycarbonate, comprising incorporating a perfluoroalkanesulphonic acid aryl ester of the general formula $$(R_FSO_2O)_xAR \quad (I)$$

wherein
R$_F$ denotes a straight-chain or branched, aliphatic perfluoro-ligand with 1 to 20 carbon atoms
x is an integer from 1 to 20 and
Ar denotes a substituted or unsubstituted, carbocyclic or heterocyclic aromatic radical, which can consist of a ring or fused rings or bridged rings,
as anti-drip agent in a flame-repellant moulding composition comprising a flame proofing agent and a thermoplastic aromatic polycarbonate resin selected from the group consisting of a homopolycarbonate based on 2,2-bis-(4-hydroxyphenyl)-propane, and a copolycarbonate of said 2,2-bis-(4-hydroxyphenyl)-propane with up to 20% by weight of at least one of 4,4'-dihydroxydiphenyl, α,α'-bis-(4-hydroxyphenyl)-p-isopropylbenzene, hydroquinone, bis-(hydroxyphenyl)sulphide, bis-(hydroxyphenyl)ether, bis-(hydroxyphenyl)ketone, bis-(hydroxyphenyl)sulphoxide, bis-(hydroxyphenyl)sulphone, 2,2-bis-(3,5-dichloride-4-hydroxyphenyl)-propane and 2,2-bis(3,5-dibromo-4-hydroxyphenyl)-propane, in a drip-suppressing amount.

2. A process according to claim 1, in which the anti-drip agent of formula (I) is used in an amount of 0.2 to 2% by weight, based on the thermoplastic polycarbonate.

3. A process for the preparation of a moulding composition based on a thermoplastic aromatic polycarbonate containing a flameproofing agent and an anti-drip agent in which an amount of 0.02 to 2% by weight, based on the thermoplastic polycarbonate, of the flameproofing agent is incorporated, at the same time as or successively with an amount of 0.2% by weight to 2% by weight, based on the thermoplastic polycarbonate, of the anti-drip agent of the formula (I) as defined in claim 1 into the thermoplastic polycarbonate at a temperature of 280° C. to 310° C., via a twin-screw extruder with a speed of rotation of 80 to 100 revolutions per minute and a throughput of 5 kg/hour, said polycarbonate resin being selected from the group consisting of a homopolycarbonate based on 2,2-bis-(4-hydroxyphenyl)-propane, and a copolycarbonate of said 2,2-bis-(4-hydroxyphenyl)-propane with up to 20% by weight of at least one of 4,4'-dihydroxydiphenyl, α,α'-bis-(4-hydroxyphenyl)-p-isopropylbenzene, hydroquinone, bis-(hydroxyphenyl)-sulphide, bis-(hydroxyphenyl)-ether, bis-(hydroxyphenyl)-ketone, bis-(hydroxyphenyl)-sulphoxide, bis-(hydroxyphenyl)-sulphone, 2,2-bis-(3,5-dichloride-4-hydroxyphenyl)-propane and 2,2-bis-(3,5-dibromo-4-hydroxyphenyl)-propane.

4. A process according to claim 3, in which the flameproofing agent and anti-drip agent are incorporated into the thermoplastic polycarbonate at a temperature of 290° C. to 300° C.

5. A process according to claim 1, in which the ligand R$_F$ has 4 to 12 carbon atoms.

6. A process according to claim 5, in which R$_F$ denotes a perfluorobutane or perfluorooctane radical.

7. A process according to claim 1, in which x is an integer from 1 to 6.

8. A process according to claim 1, in which Ar denotes a phenyl, triphenyl or phenylisopropylphenyl radical.

9. A process according to claim 1, in which the flameproofing agent in the polycarbonate is an alkali metal salt of perfluorobutanesulphonic acid, of diphenylsulphone-3-sulphonic acid or of diphenylsulphone-3,3'-disulphonic acid.

10. A process according to claim 1 wherein said polycarboante resin is branched.

11. A moulding composition resulting from the process of claim 1.

12. A moulding composition based on a thermoplastic aromatic polycarbonate containing 0.02 to 2% by weight, based on the thermoplastic polycarbonate, of a flameproofing agent and containing an anti-drip agent, in which the anti-drip agent is a perfluoroalkanesulphonic acid aryl ester of the formula (I) as defined in claim 1, in an amount of 0.2% by weight to 2% by weight, based on the thermoplastic polycarbonate, said polycarbonate resin being selected from the group consisting of a homopolycarbonate based on 2,2-bis-(4-hydroxyphenyl)-propane, and a copolycarbonate of said 2,2-bis-(4-hydroxy-phenyl)-propane with up to 20% by weight of at least one of 4,4'-dihydroxydiphenyl, α,α'-bis-(4-hydroxyphenyl)-p-isopropylbenzene, hydroquinone, bis-(hydroxyphenyl)-sulphide, bis-(hydroxyphenyl)-ether, bis-(hydroxyphenyl)-ketone, bis-(hydroxyphenyl)-sulphoxide, bis-(hydroxyphenyl)-sulphone, 2,2-bis-(3,5-dichloride-4-hydroxyphenyl)-propane and 2,2-bis-(3,5-dibromo-4-hydroxyphenyl)-propane.

13. A process for the treatment of a polycarbonate comprising incorporating a drip-suppressing amount of an ester of the formula $$(R_FSO_2O)_xAr$$

wherein
R$_F$ denotes a straight-chain or branched, aliphatic perfluoro-ligand with 1 to 20 carbon atoms
x is an integer from 1 to 20 and
Ar denotes a carbocyclic or a heterocyclic aromatic radical which consists of a ring or fused rings or bridged rings, wherein bridging unit is selected from the group consisting of methylene and isopropylene, in a flame repellent molding composition comprising a flame proofing agent and a polycarbonate resin selected from the group consisting of a homopolycarbonate based on 2,2-bis-(4-hydroxyphenyl)-propane, and a copolycarbonate of said 2,2-bis-(4-hydroxyphenyl)-propane with up to 20% by weight of at least one of 4,4'-dihydroxydiphenyl, α,α'-bis-(4-hydroxyphenyl)-p-isopropylbenzene, hydroquinone, bis-(hydroxyphenyl)-sulphide, bis-(hydroxyphenyl)-ether, bis-(hydroxyphenyl)-ketone, bis-(hydroxyphenyl)-sulphoxide, bis-(hydroxyphenyl)-sulphone, 2,2-bis-(3,5-dichloride-4-hydroxyphenyl)-propane and 2,2-bis-(3,5-dibromo-4-hydroxyphenyl)-propane.

14. The process of claim 13 wherein said aromatic radical is substituted by at least one member selected from the group consisting of halo and alkyl radicals.

15. A molding composition prepared by the process of claim 13.

16. A molding composition prepared by the process of claim 14.

* * * * *